(12) United States Patent
Hoferer et al.

(10) Patent No.: US 12,399,043 B2
(45) Date of Patent: Aug. 26, 2025

(54) MEASURING DEVICE FOR PROCESS AUTOMATION IN THE INDUSTRIAL ENVIRONMENT

(71) Applicant: VEGA GRIESHABER KG, Wolfach (DE)

(72) Inventors: Christian Hoferer, Offenburg (DE); Manuel Kaufmann, Berghaupten (DE)

(73) Assignee: VEGA GRIESHABER KG, Wolfach (DE)

( * ) Notice: Subject to any disclaimer, the term of this patent is extended or adjusted under 35 U.S.C. 154(b) by 14 days.

(21) Appl. No.: 17/772,757

(22) PCT Filed: Oct. 31, 2019

(86) PCT No.: PCT/EP2019/079891
§ 371 (c)(1),
(2) Date: Apr. 28, 2022

(87) PCT Pub. No.: WO2021/083528
PCT Pub. Date: May 6, 2021

(65) Prior Publication Data
US 2023/0030683 A1  Feb. 2, 2023

(51) Int. Cl.
*G01D 21/02*  (2006.01)
*G01C 17/00*  (2006.01)
(Continued)

(52) U.S. Cl.
CPC .......... *G01D 21/02* (2013.01); *G01F 23/284* (2013.01); *G01C 17/00* (2013.01); *G01F 15/068* (2013.01); *G01L 5/22* (2013.01); *G01P 1/06* (2013.01)

(58) Field of Classification Search
CPC ...... G08B 21/182; G08B 25/10; G01D 21/02; G01C 17/00; G01C 21/165; G01F 23/284;
(Continued)

(56) References Cited

U.S. PATENT DOCUMENTS 9,255,984 B1 * 2/2016 Williams .............. G01S 19/396
9,730,178 B1 * 8/2017 Syrjälahti ................. B65F 1/00
(Continued)

FOREIGN PATENT DOCUMENTS

CN  101947945 A  1/2011
CN  102616092 A  8/2012
(Continued)

OTHER PUBLICATIONS

M. A. Nassar, L. Luxford, P. Cole, G. Oatley and P. Koutsakis, "Adaptive Low-Power Wireless Sensor Network Architecture for Smart Street Furniture-based Crowd and Environmental Measurements," 2019 IEEE 20th International Symposium on WoWMoM, Washington, DC, USA, 2019, pp. 1-9. (Year: 2019).*

(Continued)

*Primary Examiner* — Lisa M Caputo
*Assistant Examiner* — Eric Sebastian Von Wald
(74) *Attorney, Agent, or Firm* — Oblon, McClelland, Maier & Neustadt, L.L.P.

(57) ABSTRACT

A measuring device for process automation in an industrial environment is provided, the measuring device including: a first sensor device configured to detect a process variable; a position detection device configured to detect a position of the measuring device; a second sensor device configured to acquire environmental data; and a controller configured to analyze the acquired environmental data, determine, based on the analysis, whether or not a current position of the measuring device should be detected, and instruct the posi- (Continued)

tion detection device to detect the current position of the measuring device when the analysis of the environmental data has determined that the current position should be detected. A method for determining a position of a measuring device is also provided.

5 Claims, 3 Drawing Sheets

(51) Int. Cl.
    *G01F 15/06* (2022.01)
    *G01F 23/284* (2006.01)
    *G01L 5/22* (2006.01)
    *G01P 1/00* (2006.01)

(58) Field of Classification Search
CPC .... G01F 15/068; G01F 15/06; G01F 23/2962; G01F 15/066; G01F 23/00; G01F 23/804; G01L 5/22; G01L 3/1435; G01L 9/00; G01L 19/086; G01P 1/06; G01P 15/18; G01P 13/00; G06Q 10/087; G06Q 50/28; G01S 19/42; G01S 15/08; G01S 19/01; G05B 23/0221; G05B 23/0256; G05B 19/4183; G05B 2219/31001; G05B 23/0283; G05B 19/41865; H04W 64/00; H04W 4/029; G06K 7/015; G06K 7/10297
See application file for complete search history.

(56) References Cited

U.S. PATENT DOCUMENTS

| | | | | |
|---|---|---|---|---|
| 11,307,639 | B2* | 4/2022 | Yan | G06F 1/26 |
| 2003/0134657 | A1* | 7/2003 | Norta | G01S 5/0205 |
| | | | | 342/357.46 |
| 2004/0031335 | A1* | 2/2004 | Fromme | G01F 22/00 |
| | | | | 73/865 |
| 2008/0133134 | A1* | 6/2008 | Ronish | G01V 1/001 |
| | | | | 701/469 |
| 2013/0169475 | A1* | 7/2013 | Lanes | G01S 19/40 |
| | | | | 342/357.23 |
| 2016/0069640 | A1* | 3/2016 | Pretorius | F41G 3/065 |
| | | | | 42/122 |
| 2016/0273907 | A1* | 9/2016 | Bonin | G01B 11/0616 |
| 2017/0031030 | A1* | 2/2017 | Verdugo | G01S 17/10 |
| 2017/0354858 | A1* | 12/2017 | Lewis | A63B 69/36 |
| 2018/0259376 | A1* | 9/2018 | Yamauchi | B81B 7/0087 |
| 2018/0292244 | A1* | 10/2018 | VanWart | G01D 21/02 |
| 2018/0330315 | A1* | 11/2018 | Gurumohan | H04W 76/14 |
| 2019/0272496 | A1 | 9/2019 | Moeller | |
| 2019/0311333 | A1* | 10/2019 | Kekalainen | H04W 4/38 |
| 2020/0355536 | A1 | 11/2020 | Welle et al. | |
| 2021/0357846 | A1* | 11/2021 | Thoren | G05B 23/0267 |

FOREIGN PATENT DOCUMENTS

| | | |
|---|---|---|
| CN | 102821356 A | 12/2012 |
| CN | 102841371 A | 12/2012 |
| CN | 102901975 A | 1/2013 |
| CN | 102910146 A | 2/2013 |
| CN | 103675857 A | 3/2014 |
| CN | 103680072 A | 3/2014 |
| CN | 106535118 A | 3/2017 |
| CN | 106793074 A | 5/2017 |
| CN | 106846880 A | 6/2017 |
| CN | 108508455 A | 9/2018 |
| CN | 208969244 U | 6/2019 |
| CN | 110031037 A | 7/2019 |
| CN | 110097391 A | 8/2019 |
| DE | 10 2009 000 880 A1 | 3/2010 |
| DE | 10 2016 209 837 A1 | 12/2017 |
| EP | 1 043 599 A2 | 10/2000 |
| EP | 3 282 231 A1 | 2/2018 |
| KR | 10-2014-0094147 A | 7/2014 |
| WO | WO 2016/115400 A1 | 7/2016 |
| WO | WO-2017026582 A1 * | 2/2017 ............ G01S 19/01 |

OTHER PUBLICATIONS

S. Chen, Y. Chen and W. Trappe, "Exploiting Environmental Properties for Wireless Localization and Location Aware Applications," 2008 Sixth Annual IEEE International Conference on Pervasive Computing and Communications (PerCom), Hong Kong, China, 2008, pp. 90-99. (Year: 2008).*
D. Puccinelli and M. Haenggi, "Wireless sensor networks: applications and challenges of ubiquitous sensing," in IEEE Circuits and Systems Magazine, vol. 5, No. 3, pp. 19-31, 2005. (Year: 2005).*
English translation of International Preliminary Report on Patentability and Written Opinion issued May 12, 2022 in PCT/EP2019/079891, 8 pages.
Russian Search Report issued on Mar. 23, 2023 in Russian Patent Application No. 2022114435/28 (with Translation of Category of Cited Documents), 3 pages.
International Search Report issued Jun. 4, 2020 in PCT/EP2019/079891 filed on Oct. 31, 2019, 2 pages.
Combined Chinese Office Action and Search Report issued Aug. 29, 2024 in Chinese Patent Application No. 201980101037.4 (with English Translation of Category of Cited Documents), 12 pages.
Combined Chinese Office Action and Search Report issued Jan. 5, 2025, in corresponding Chinese Patent Application No. 201980101037.4 (with English Translation of Category of Cited Documents) 10 pages.

* cited by examiner

MEASURING DEVICE FOR PROCESS AUTOMATION IN THE INDUSTRIAL ENVIRONMENT

FIELD OF INVENTION

The invention relates to process automation in an industrial environment. In particular, the invention relates to a measuring device for process automation in an industrial environment, a plurality of uses of such a measuring device, a method for determining the position of a measuring device, a program element, and a computer-readable medium.

BACKGROUND

Measuring devices for process automation in the industrial environment can be used to record physical measured variables from a medium in a container or tank. The containers and tanks usually have a fixed assigned location. However, there are applications where the location of a container can change. An example of this are so-called IBCs, which are already mounted on a pallet as intended and are thus equipped for variable use. In this way, several such containers can be kept in stock at a storage location in order to transport them to an extraction point as required. The tank that has already been emptied there can be exchanged for a tank from the warehouse. For a user who wants to be constantly informed about the current location and quantity of his supplies, level measuring devices are an option that can transmit both the level and the location of the individual tanks to a control center via radio. A battery or other energy storage device in the measuring device is provided for the energy supply of such measuring devices.

SUMMARY

There may be a desire to have a measuring device for process automation in an industrial environment which reliably supplies measurement data over a long period of time.

This desire is met by the features of the independent patent claims. Further embodiments of the invention result from the subclaims and the following description of embodiments.

A first aspect relates to a measuring device for process automation in an industrial environment. The measuring device comprises a first sensor device which is configured to detect a process variable, for example a filling level, a limit level, a pressure, a flow rate, the topology of a product surface or the volume of a filling or bulk material.

The measuring device has a position detection device that is configured to detect, i.e., to capture or measure, the position of the measuring device. Examples are GPS position acquisition devices or those using Galileo, GLONASS, Beidou, mobile radio signals, Bluetooth or so-called "indoor position determination".

A second sensor device is provided, which is configured to record environmental data. This environmental data can be, for example, acceleration data, position data (for example via mobile radio signals), compass data and/or switching data (detection of a button press or approach of a finger).

The measuring apparatus comprises control means, i.e. a controller, configured to analyze the environmental data and to determine whether or not, based on this analysis, a current position of the measuring apparatus should be detected by the position detection means. The control means is further configured to instruct the position detection device to sense the current position of the measuring device when the analysis of the environmental data has determined that the current position should be sensed.

This may save energy, since the position detection device is only used for current position sensing when it is needed, for example because the position of the measuring device has changed due to movement of the container.

The terms "first sensor device", "second sensor device", "position detection device" and "control device" or "controller" are to be interpreted broadly. The decisive factor is that these individual devices are set up to carry out the intended measures, regardless of whether they are coherent units or sub-units located at different points on the measuring instrument.

The term "process automation in the industrial environment" can be understood as a subfield of technology that includes all measures for the operation of machines and plants without the involvement of humans. One goal of process automation is to automate the interaction of individual components of a plant in the chemical, food, pharmaceutical, petroleum, paper, cement, shipping or mining industries. A wide range of sensors can be used for this purpose, which are adapted in particular to the specific requirements of the process industry, such as mechanical stability, insensitivity to contamination, extreme temperatures and extreme pressures. Measured values from these sensors are usually transmitted to a control room, where process parameters such as level, limit level, flow rate, pressure or density can be monitored and settings for the entire plant can be changed manually or automatically.

One subarea of process automation in the industrial environment concerns logistics automation. With the help of distance and angle sensors, processes within a building or within an individual logistics facility are automated in the field of logistics automation. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and position of an object is required by the respective application. Sensors based on optical measurement methods using lasers, LEDs, 2D cameras or 3D cameras that measure distances according to the time-of-flight (ToF) principle can be used for this purpose.

Another sub-area of process automation in the industrial environment concerns factory/production automation. Use cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

Accordingly, one aspect of the present disclosure relates to a self-contained level measurement device for measuring a level in a container, the level measurement device comprising:

A level measuring unit (first sensor device), set up for measuring a level of a container, tank or the like;

At least one transceiver unit (e.g., LoRaWan) set up to communicate with a data processing unit;

A module for position determination (e.g. GPS/Galileo/Glonass/Beidou/Beacon) (position acquisition device);

A sensor for detecting environmental data (second sensor device);

An evaluation logic (control device) that determines whether to trigger a position update based on the environmental data;

An energy storage device (capacitor/battery) to supply the components.

According to an embodiment, the position detection device is configured to detect the current position of the measuring device only if the analysis of the environmental data has shown that the current position should be detected. Otherwise, the current position of the measuring device is not detected.

According to a further embodiment, the measuring device has a data memory that is configured to store the current position of the measuring device. At a later point in time, the measured, current position of the measuring device can then be transmitted to an external device, typically by means of radio transmission, if necessary together with the measurement data associated with the acquisition of the process variable. However, the transmission can also be carried out by wire, for example via a 4 to 20 mA two-wire line.

According to an embodiment, however, the measuring device is a self-sufficient measuring device with an exclusively internal power supply in the form of a battery or one or more other energy storage devices.

According to a further embodiment, the control device is configured to instruct the position detection device to detect the current position of the measuring device only if the analysis of the environmental data has shown that the measuring device has been moved. In particular, it can be provided that the current position of the measuring device is only detected when the analysis of the environmental data has shown that the measuring device has been moved and is now actually stationary. This can further reduce the number of position measurements.

According to a further embodiment, the control device is configured to recognize a movement pattern of the measuring device from the analysis of the environmental data. Artificial intelligence can be used for this purpose. For example, the control device can be set up to recognize that the measuring device was moved together with the container and then set down. Thereupon, the position determination can be triggered.

According to a further embodiment, the measuring device comprises an energy storage device. It may also have a switch arranged to close the connection between the energy storage device and the position detection device to be supplied with energy by the energy storage device. When the switch is closed, position determination is performed by the position sensing device.

According to a further embodiment, the second sensor device comprises an acceleration sensor, a position determination device by means of mobile radio signals, a compass and/or a current meter.

A further aspect relates to the use of a measuring device described above and below for level measurement. A further aspect relates to the use of a measuring device described above and below for pressure measurement. A further aspect relates to the use of a measuring device described above and below for flow measurement. A further aspect relates to the use of a measuring device described above and below for measuring a process variable, for example a filling level, the topology of a product surface or the amount of a product in a mobile container.

Another aspect relates to a method for determining the position of a measuring device, wherein a process variable is acquired, environmental data of the measuring device is acquired, this environmental data is analyzed, and it is determined whether or not, based on the analysis, a current position of the measuring device should be measured. After this analysis, if the analysis of the environmental data determines that the current position of the measuring device should be measured, then the current position of the measuring device is measured. Otherwise not.

Another aspect relates to a program element that, when executed on a control device of a measuring instrument, instructs the measuring instrument to perform the method steps described above and below.

Another aspect relates to a computer-readable medium on which a program element described above is stored.

The computer program may, for example, be loaded and/or stored in a main memory of a data processing device, such as a data processor, wherein the data processing device may also be part of an embodiment of the present invention. This data processing device may be arranged to perform method steps of the method described above. The data processing device may further be arranged to execute the computer program and/or the method automatically and/or to execute input from a user. The computer program may also be provided over a data network, such as the Internet, and downloaded from such a data network into the memory of the data processing device. The computer program may also comprise an update to an existing computer program, whereby the existing computer program may be enabled to perform the method described above, for example.

The computer-readable storage medium may be, in particular, but not necessarily, a non-volatile medium that is particularly suitable for storing and/or distributing a computer program. The computer-readable storage medium may be a CD-ROM, a DVD-ROM, an optical storage medium, a solid-state medium, or the like, provided with or as part of other hardware. Additionally or alternatively, the computer-readable storage medium may be distributed or distributed in other forms, such as over a data network, such as the Internet or other wired or wireless telecommunications systems. For this purpose, the computer-readable storage medium may take the form of one or more data packets, for example.

In the following, embodiments are described with reference to the figures. The representation in the figures is not to scale. If the same reference signs are used in the following description of the figures, these designate the same or similar elements.

DETAILED DESCRIPTION OF EMBODIMENTS

Figure 1:
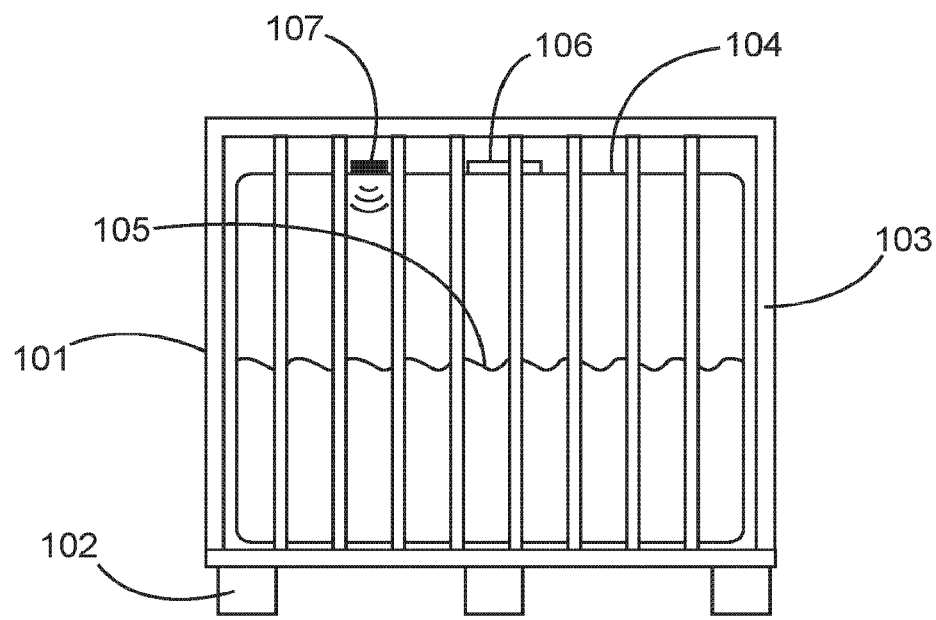
FIG. 1 shows a container with a measuring device arranged therein.

FIG. 1 shows an example of a so-called IBC 101, which is used to transport media. This weight-, volume- and cost-optimized design is particularly popular in the distribution and logistics industry, and makes it easy to supply customers with a wide variety of media. The IBC 101 usually consists of a pallet 102, a metal frame 103 and a container bladder 104, typically made of plastic, which contains the filling medium 105. The medium 105 can be introduced into the container 101 or into the container bladder 104 via a lid 106.

The measuring device 107 may be, for example, a level measuring device typically attached to an upper surface of the container bladder 104 and having a first sensor means that measures the distance to the product surface 105 using, for example, electromagnetic waves. The measuring device 107 may then provide the measurement result to the outside.

Furthermore, the measuring device 107 comprises a communication module for wireless communication (e.g. Narrowband IoT, LPWA (Low Power Wide Area) communication, Lora, Sigfox, MIOTY, LoRaWAN, Bluetooth). Further, the measurement device 107 comprises a position determination module (position acquisition device) and another sensor (second sensor device) whose data is used to decide whether to perform a position determination. Only if an evaluation logic (control device) detects that a position update is necessary, the position determination module is supplied with sufficient energy. The aim is to reduce the energy consumption of the position determination.

One aspect is the interaction between the control device, the position determination module and the second sensor device for detecting whether a position update is necessary. The position determination module (GPS/Galileo/Glonass/Beidou/Mobile phone network/Bluetooth/Indoor position determination) requires a lot of energy during operation and should therefore only be activated for a very short time. The sensor to detect if a position update is necessary or useful can be e.g. an acceleration sensor or a simple push button. The energy consumption of this sensor is significantly lower than the energy consumption of the module for position determination. Consequently, the invention reduces the overall energy consumption of the measuring device.

The energy supply of such measuring devices is usually not wired, as otherwise the flexibility would be severely impaired. Therefore, self-sufficient solutions by means of energy storage units are necessary to ensure the energy supply of the measuring device. This means that all components of the measuring device are supplied by at least one energy storage device. A form of energy harvesting, in which the energy storage is replenished by means of photovoltaics, for example, is also possible. Nevertheless, the requirement that each individual component of the measuring device consumes as little unnecessary energy as possible is of utmost relevance. Energy-intensive processes in particular, such as position determination, must therefore be reduced to a minimum.

From the above use case, which describes that a tank first remains in a storage location and after a certain time is transported to an extraction point, it quickly becomes apparent that the position determination of the measuring device is only required at exactly two locations. The first time a position update of the position data persistently stored in the gauge is necessary is when the tank with the gauge has reached its fixed storage location in the warehouse. After that, the position does not change for a longer period of time and the position determination can be deactivated to save energy.

A complete disconnection of the energy supply by means of a circuit, switch or transistor is possible, or also a solution in which the position determination module is set to an energy-saving state. The measuring device is set up in such a way that after a certain period of time it initiates a measured value acquisition, for example a level measurement, and makes the measured value (level) with the last stored position data known to a user via a radio module. This process can be repeated sequentially. The level measuring device continues to supply correct position data until the tank is moved again. In the meantime, the position determination module can remain deactivated. An update of the position is not necessary, since both the tank and the level measurement system remain stationary. Only when the tank has reached the tapping point in the example shown does a position update make sense. The control unit uses the sensor data (environmental data) from the second sensor device to detect whether a position update is necessary, ensures the power supply to the position determination module and updates the existing position data. A new measurement can then be initiated and the updated position data can be sent with the fill level of the tank via a radio module.

Whether a position determination is required during the transport of the tank and whether the measuring device then continuously updates its position data when transmitting via a radio module can, if necessary, be determined by the user himself and communicated to the measuring device via a parameterization interface or parameter interface.

According to a further embodiment, the transmission of the position data is also stopped during a movement of the tank. Alternatively, it can be provided that instead of the position data, a status signaling that the measuring device and the tank are being moved is transmitted via the radio module.

For the second sensor device, which collects environmental data that is then evaluated to decide whether a position update needs to be performed, various embodiments are possible that find their practical application individually or as a combination:

Pushbutton/Switch:

In the simplest case, the second sensor device is represented by a pushbutton or switch. The environmental data is then the pressure on the pushbutton, the closing of a contact by a finger or a tool, or a capacitance change in the case of a capacitive pushbutton. The pushbutton/switch must be operated manually as soon as the tank with the measuring device has reached its destination.

Accelerometer:

An acceleration sensor detects that the tank is moved with the meter. The acceleration sensor has a very low energy consumption. In addition, it is possible to provide the acceleration sensor with a neural network or other artificial intelligence in order to react only to certain movement patterns. A uniform movement that results in a change in position can thus be distinguished from a vibration that is not relevant. Also possible are simple forms of sensors that detect motion by, for example, a fine metal plate closing a contact.

It may be advantageous to perform the position update only when it has been detected that the tank has reached its destination. For example, after an acceleration during a waiting time, it can be observed whether a further acceleration does not follow. Only when it is ensured that the tank has reached a fixed location can the position update then be performed. The detection of movement patterns is also helpful here. In this way, it can be detected whether the tank is first moved and then set down.

Radio Cell Detection:

A sensor or communication module that detects the current radio cell of a mobile radio network or the reception strengths of various masts and concludes a change in position when the reception characteristics change, which is then verified via the position determination module.

Timer:
A timer that cyclically initiates a position update.

Compass:
A compass whose orientation is continuously detected and performs a position update when there is a change.

Current Meter at Energy Harvesting:
If the measuring device has devices for energy harvesting, a sensor can be used to evaluate whether there is currently surplus or at least sufficient energy available to perform a position update.

Figure 2:
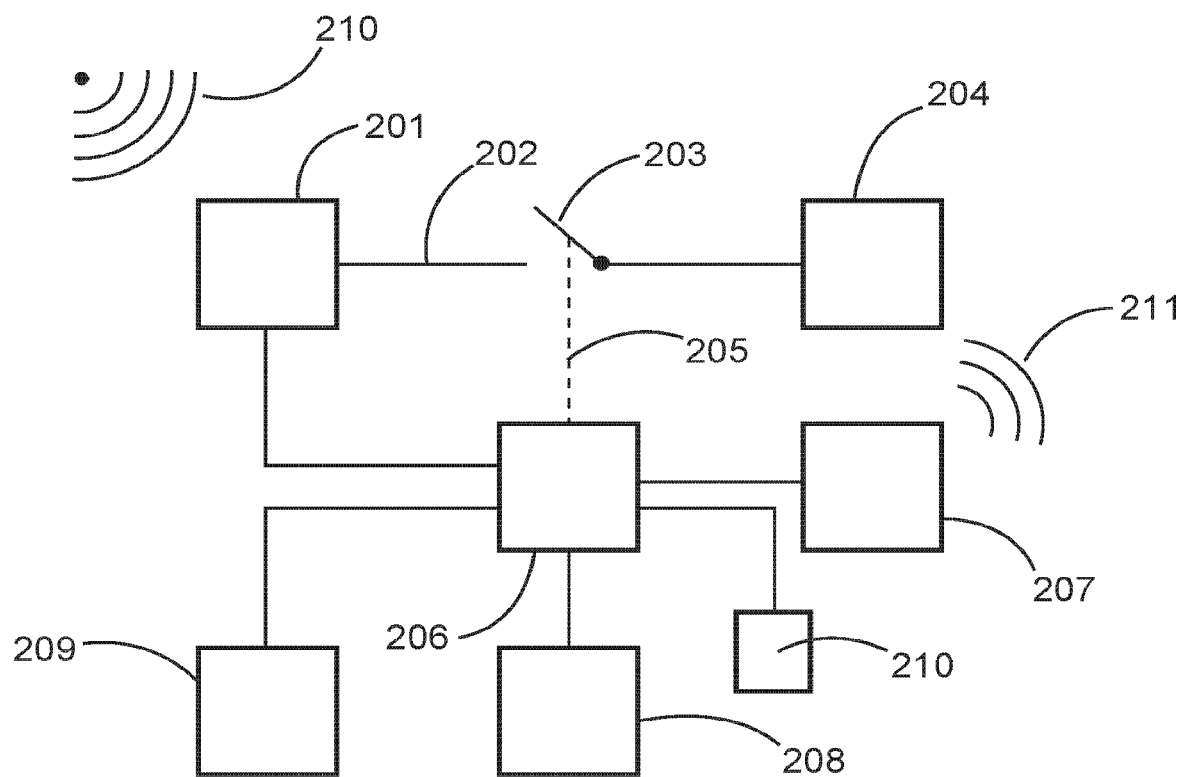
FIG. 2 shows the structure of a measuring device according to an embodiment.

FIG. 2 shows the function of a measuring device according to one embodiment. A position module (position detection device) 201 for receiving position data 210 is supplied with energy from an energy storage device 204 (battery, capacitor) via a line 202. The line 202 includes a switching device 203 (mechanical switch, transistor, circuit) that can be used to disconnect the position module 201 from the energy supply or to supply it with energy. The switching device 203 can be influenced by a control line 205 with a control direction 206 (microcontroller, logic circuit). The control direction 206 or the microcontroller 206 can perform other functions. Links to the position module 201, to a radio module 207 and to a sensor for detecting filling levels 209 are shown in the figure. Analog or digital signals/data can be exchanged via the links. A further sensor 208 is connected to the control unit 206 itself, the data from which can be used to decide whether a position update is required, and a data storage device 210 for storing the position data and the measurement data.

For example, the control device 206 may first detect a fill level via the fill level sensor 209, then decide whether to power the position module 201 to request a position update from the position module 201 by evaluating the data from the sensor 208. Subsequently, all the gathered information is published via a radio module 207. The data broadcast 211 can then be received and analyzed by a user.

Figure 3:
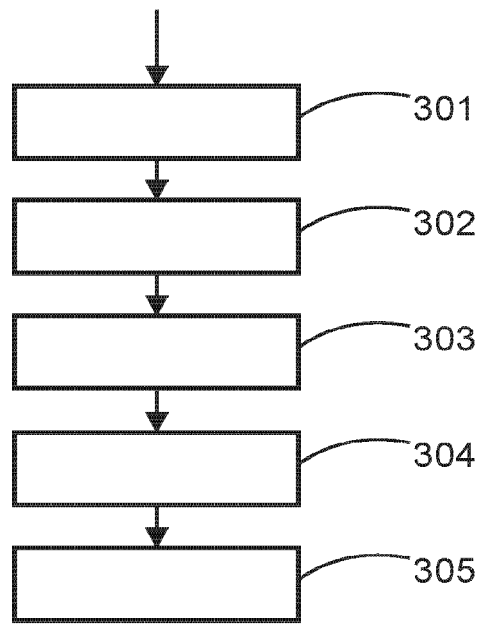
FIG. 3 shows a flow diagram of a process according to one embodiment.

FIG. 3 shows the individual steps of a position update. In step 301, the position determination module is supplied with power. In step 302, the system waits until the position determination is complete. In step 303, the position data is transferred from the position determination module to the control device. In step 304, the control device persistently stores the position data. In step 305, the power supply to the position determination module is disconnected or the module itself is set to an idle state.

Figure 4:
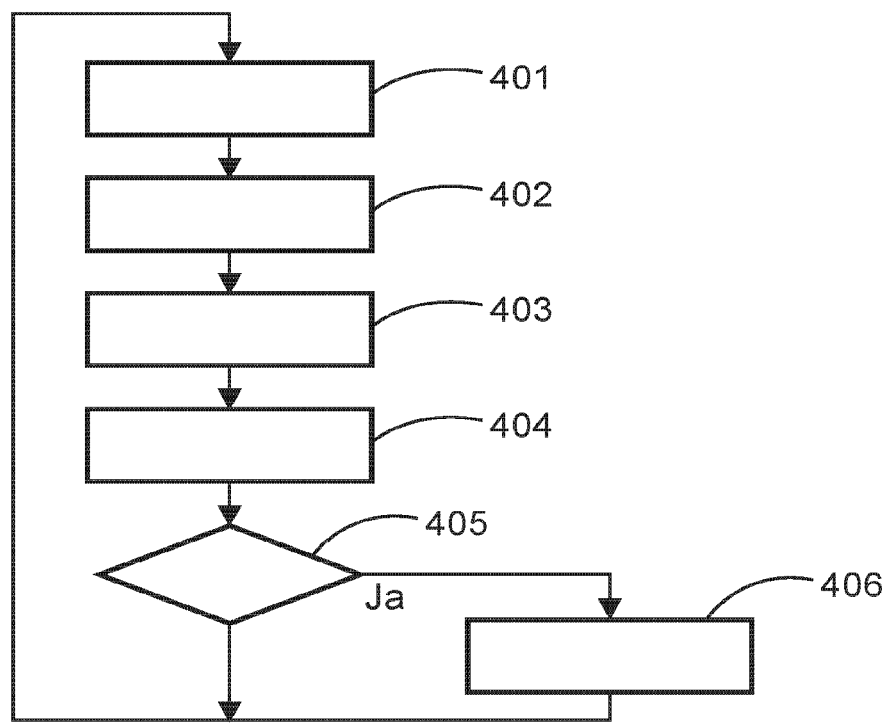
FIG. 4 shows a flow diagram of a process according to a further embodiment.

FIG. 4 shows the main program sequence of a level measuring system. In step 401, a level measurement is carried out. In step 402, the measured value of the level is transmitted via the radio module. In step 403, the stored position data of the last position update is transmitted via the radio module. In step 404, sensor data are acquired and evaluated (environmental data). In step 405, a check is made to determine whether a position update (FIG. 3) is necessary. The position update is then carried out in step 406.

It should be noted that a sequential program flow as in FIG. 4 is only one example. It is also possible that the sensor 208 triggers an interrupt, which then leads to the execution of the position update in parallel. It is also possible that the sensor, which may be located externally, has its own evaluation logic (e.g. an artificial neural network) for obtaining environmental data, which then informs the main evaluation logic via a single control line that a position update is required.

Figure 5:
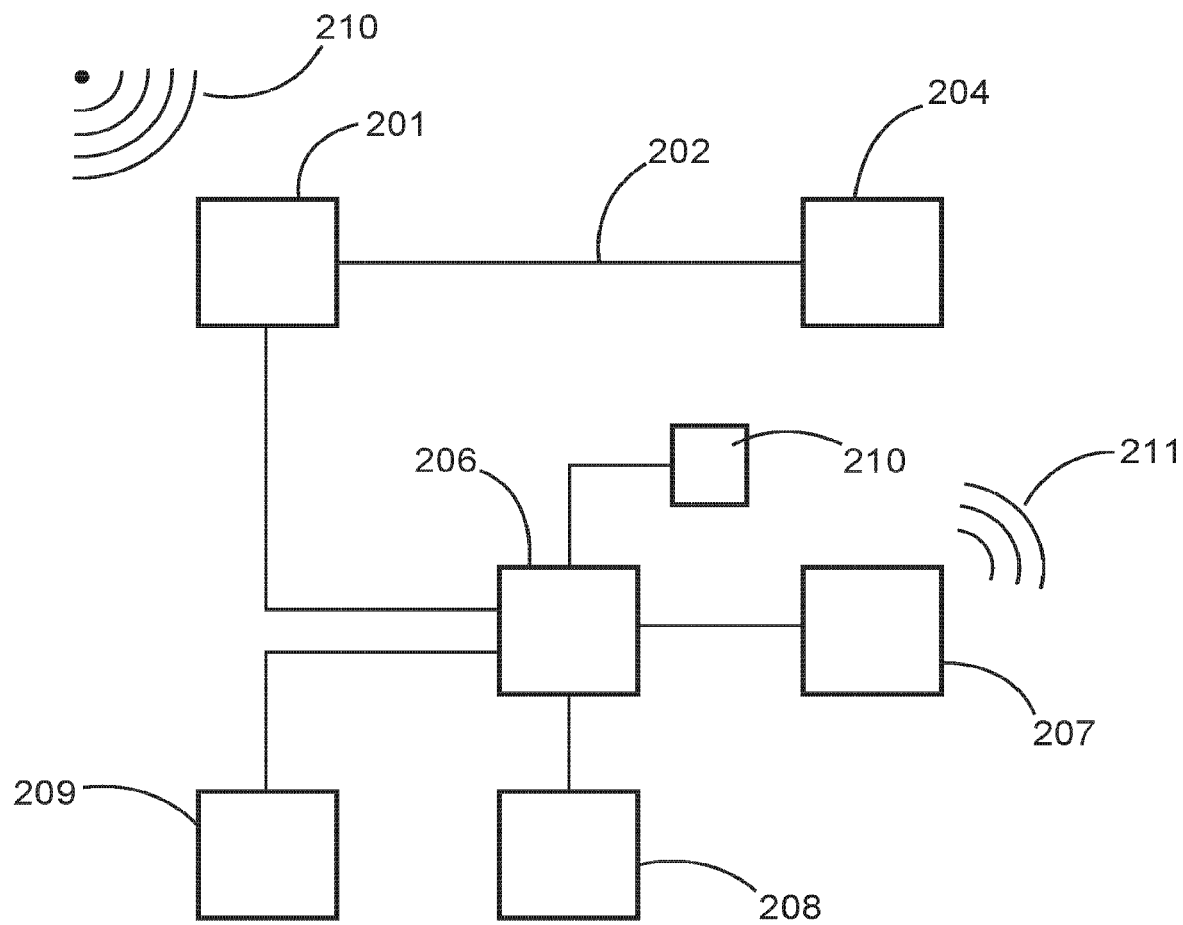
FIG. 5 shows the structure of a measuring device according to a further embodiment.

FIG. 5 shows a variation of FIG. 2, but the switching device 203 and the control line 205 are missing. The figure shows that there are also modules for position determination that can be set to an energy-saving state or even internally de-energized.

Supplementally, it should be noted that "comprising" and "having" do not exclude other elements or steps, and the indefinite articles "an" or "a" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A fill level sensor for process automation in an industrial environment, the measuring device comprising:
    a first sensor device configured to detect a process variable;
    a position detection device configured to detect a position of the measuring device;
    a second sensor device configured to acquire environmental data;
    an energy storage device;
    a switch configured to close a connection between the energy storage device and the position detection device, such that the current position of the fill level sensor is detected by the position detection device, and to open the connection after the current position of the fill level sensor has been detected;
    a controller configured to
        analyze the acquired environmental data,
        determine, based on the analysis, whether or not a current position of the measuring device should be detected, and
        only when the analysis of the environmental data has determined that the fill level sensor has been moved and is now stationary, operate the switch to close the connection between the energy storage device and the position detection device to detect the current position of the fill level sensor.

2. The fill level sensor according to claim 1, further comprising a data memory configured to store the current position of the fill level sensor.

3. The fill level sensor according to claim 1, wherein the controller is further configured to detect a pattern of movement of the fill level sensor from the analysis of the environmental data.

4. The fill level sensor according to claim 1, wherein the second sensor device comprises an acceleration sensor, a position determination device by means of mobile radio signals, a compass, and/or a current meter.

5. The fill level sensor according to claim 1, wherein the fill level sensor is configured to measure a process variable in a mobile container.

* * * * *